US011104286B2

(12) United States Patent
Boardman et al.

(10) Patent No.: US 11,104,286 B2
(45) Date of Patent: Aug. 31, 2021

(54) ENERGY ABSORPTION MEMBER FOR VEHICLE TRIM

(71) Applicant: Ford Global Technologies, LLC, Dearborn, MI (US)

(72) Inventors: Amy M. Boardman, Garden City, MI (US); Bhaskara Rao Pamarthi, Commerce Township, MI (US); Joseph Lozon, Taylor, MI (US); Marcus Oden, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 16/507,180

(22) Filed: Jul. 10, 2019

(65) Prior Publication Data

US 2021/0009065 A1  Jan. 14, 2021

(51) Int. Cl.
 B60R 21/04 (2006.01)
(52) U.S. Cl.
 CPC ...... B60R 21/04 (2013.01); *B60R 2021/0414* (2013.01); *B60R 2021/0435* (2013.01)
(58) Field of Classification Search
 CPC ............ B60R 21/04; B60R 2021/0414; B60R 2021/0435
 See application file for complete search history.

(56) References Cited

U.S. PATENT DOCUMENTS

| 5,433,478 | A | | 7/1995 | Naruse | |
|---|---|---|---|---|---|
| 5,709,407 | A | * | 1/1998 | Stephens | B60R 13/025 |
| | | | | | 280/751 |
| 5,762,392 | A | * | 6/1998 | Suga | B60R 13/025 |
| | | | | | 296/39.1 |
| 5,795,013 | A | * | 8/1998 | Keller | B60R 13/02 |
| | | | | | 280/751 |
| 5,938,273 | A | * | 8/1999 | Williams | B60R 13/0206 |
| | | | | | 280/751 |
| 5,992,924 | A | * | 11/1999 | Noritake | B60R 13/025 |
| | | | | | 280/751 |
| 6,126,231 | A | | 10/2000 | Suzuki et al. | |
| 6,264,238 | B1 | | 7/2001 | MacDonald et al. | |
| 6,779,835 | B2 | | 8/2004 | Fox et al. | |
| 10,053,046 | B2 | | 8/2018 | Villacres Mesias et al. | |
| 10,875,473 | B2 | * | 12/2020 | Isosaki | B60R 13/025 |
| 2006/0145490 | A1 | * | 7/2006 | Yamaguchi | B60R 21/04 |
| | | | | | 293/109 |
| 2006/0202459 | A1 | * | 9/2006 | Friedrich | B60R 21/04 |
| | | | | | 280/751 |
| 2007/0108742 | A1 | * | 5/2007 | Itakura | B60R 21/213 |
| | | | | | 280/728.3 |
| 2007/0182216 | A1 | | 8/2007 | Ludwig | |

(Continued)

FOREIGN PATENT DOCUMENTS

JP 2005121225 A 5/2005
WO WO-2018220695 A1 * 12/2018 ........... B60R 13/025

*Primary Examiner* — Lori L Lyjak
(74) *Attorney, Agent, or Firm* — David Coppiellie; Price Heneveld LLP

(57) ABSTRACT

A vehicle includes a vehicle body including a pillar. The pillar includes a support structure. A passenger compartment is defined by the vehicle body. A trim member disposed in the passenger compartment on the pillar. An energy absorption member is coupled to the trim member. The energy absorption member includes a base and at least one rib extending from the base.

19 Claims, 4 Drawing Sheets

(56) References Cited

U.S. PATENT DOCUMENTS

2016/0229457 A1* 8/2016 Boettcher ............ B62D 29/005
2017/0066399 A1* 3/2017 Villacres Mesias ........................
　　　　　　　　　　　　　　　　　　　　　B60R 21/23138

* cited by examiner

ENERGY ABSORPTION MEMBER FOR VEHICLE TRIM

FIELD OF THE DISCLOSURE

The present disclosure generally relates to an energy absorption member. More specifically, the present disclosure relates to an energy absorption member for a B-surface of a trim member of a vehicle.

BACKGROUND OF THE DISCLOSURE

Trim panels are often disposed on interior and exterior locations of a vehicle to improve aesthetics. An A-surface of the trim panel may have a selected aesthetic with minimal defects, such as sink marks.

SUMMARY OF THE DISCLOSURE

According to at least one aspect of the present disclosure, a vehicle includes a vehicle body including a pillar. The pillar includes a support structure. A passenger compartment is defined by the vehicle body. A trim member disposed in the passenger compartment on the pillar. An energy absorption member is coupled to the trim member. The energy absorption member includes a base and at least one rib extending from the base.

According to another aspect of the present disclosure, a trim member for a vehicle pillar includes a body having a first surface and a second surface. The first and second surfaces are opposing surfaces. A base is coupled to the second surface of the body. The base includes sidewalls coupled via a connecting wall. More than one rib is coupled to an outer surface of the connecting wall of the base.

According to another aspect of the present disclosure, a trim member includes a body having a first surface and a second surface. A base is integrally formed with the base. The base includes sidewalls and a connecting wall. The connecting wall is spaced-apart from the second surface of the body. A plurality of ribs is coupled to and extends from the connecting wall of the base.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1:
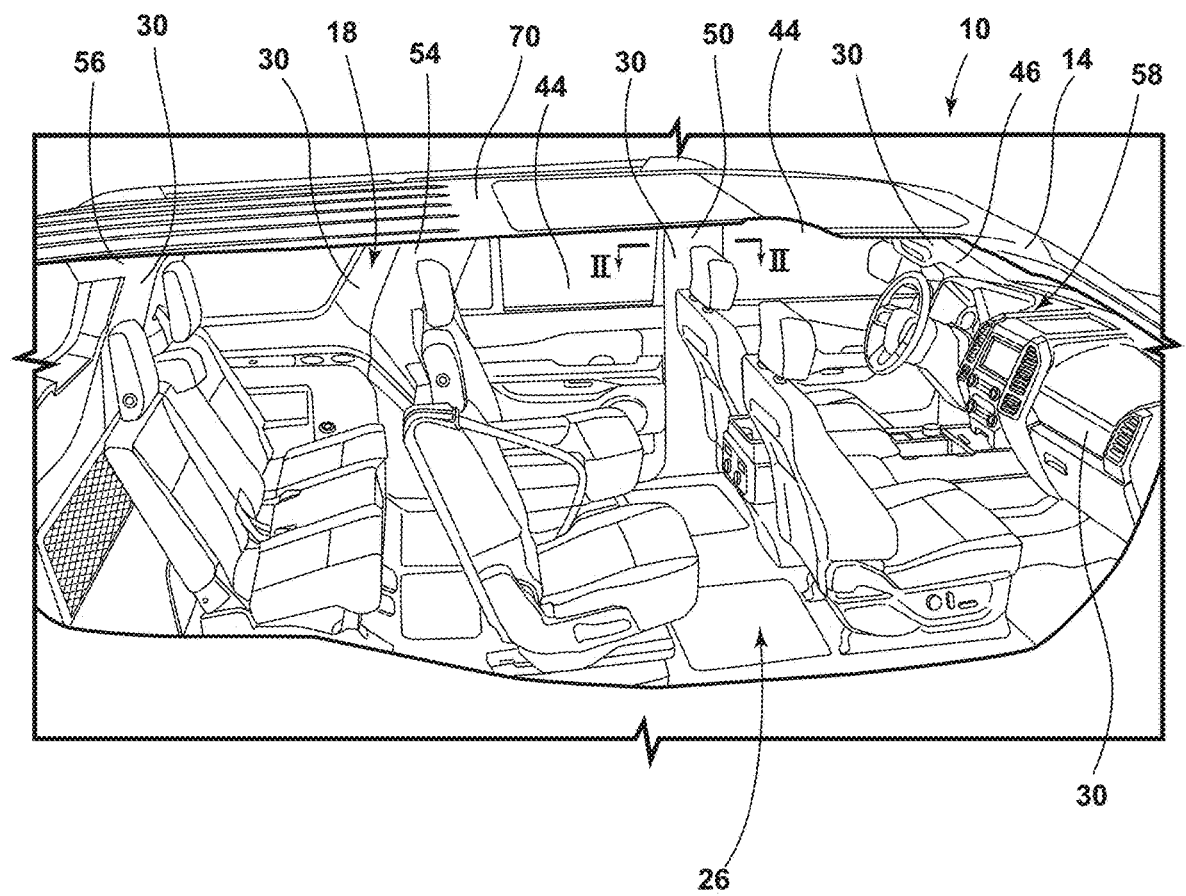
FIG. 1 is a partial side perspective view of a passenger compartment of a vehicle, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-4, reference numeral 10 generally refers to a vehicle, which includes a vehicle body 14 defining a pillar 18. The pillar 18 includes a support structure 22. The vehicle body 14 defines a passenger compartment 26. A trim member 30 is disposed in the passenger compartment 26 on the pillar 18. An energy absorption member 34 is coupled to the trim member 30. The energy absorption member 34 includes a base 38 and a rib 42 extending from the base 38.

Referring to FIG. 1, the vehicle 10 includes the vehicle body 14, which defines an interior 58 of the vehicle 10 having the passenger compartment 26 therein. The vehicle body 14 also includes various pillars 18, which may be disposed between adjacent vehicle windows 44. As illustrated, the vehicle 10 includes an A-pillar 46, a B-pillar 50, a C-pillar 54, and a D-pillar 56, however, fewer or more pillars 18 may be included in the vehicle 10. The vehicle 10 may include a variety of trim members 30 for providing a selected aesthetic to the vehicle 10. The trim members 30, as illustrated in FIG. 1, may be positioned on the interior 58 of the vehicle 10. For example, the trim member 30 may be an interior door panel, an interior pillar feature (e.g., A-, B-, C-, and/or D-pillars 46, 50, 54, 56), a steering wheel cover, an infotainment system cover, a dash cover of an instrument panel, center console cover, glove box door, cup holder, or other trim members 30. Additionally or alternatively, the trim members 30 may be disposed on an exterior 70 of the vehicle 10, without departing from the teachings herein. It will be understood that the foregoing description is exemplary and that other trim members 30 may be equally applicable to the teachings provided herein.

Moreover, the vehicle 10 is a wheeled motor vehicle 10, which may be a sedan, a sport utility vehicle, a truck, a van, a crossover, and/or other style of vehicle 10. The vehicle 10 may be a manually operated vehicle 10 (e.g., with a human driver), a fully autonomous vehicle 10 (e.g., no human driver), or a partially autonomous vehicle 10 (e.g., may be operated with or without a human driver). Additionally, the vehicle 10 may be utilized for personal and/or commercial purposes, such as ride-providing services (e.g., chauffeuring) and/or right-sharing services.

Figure 2:
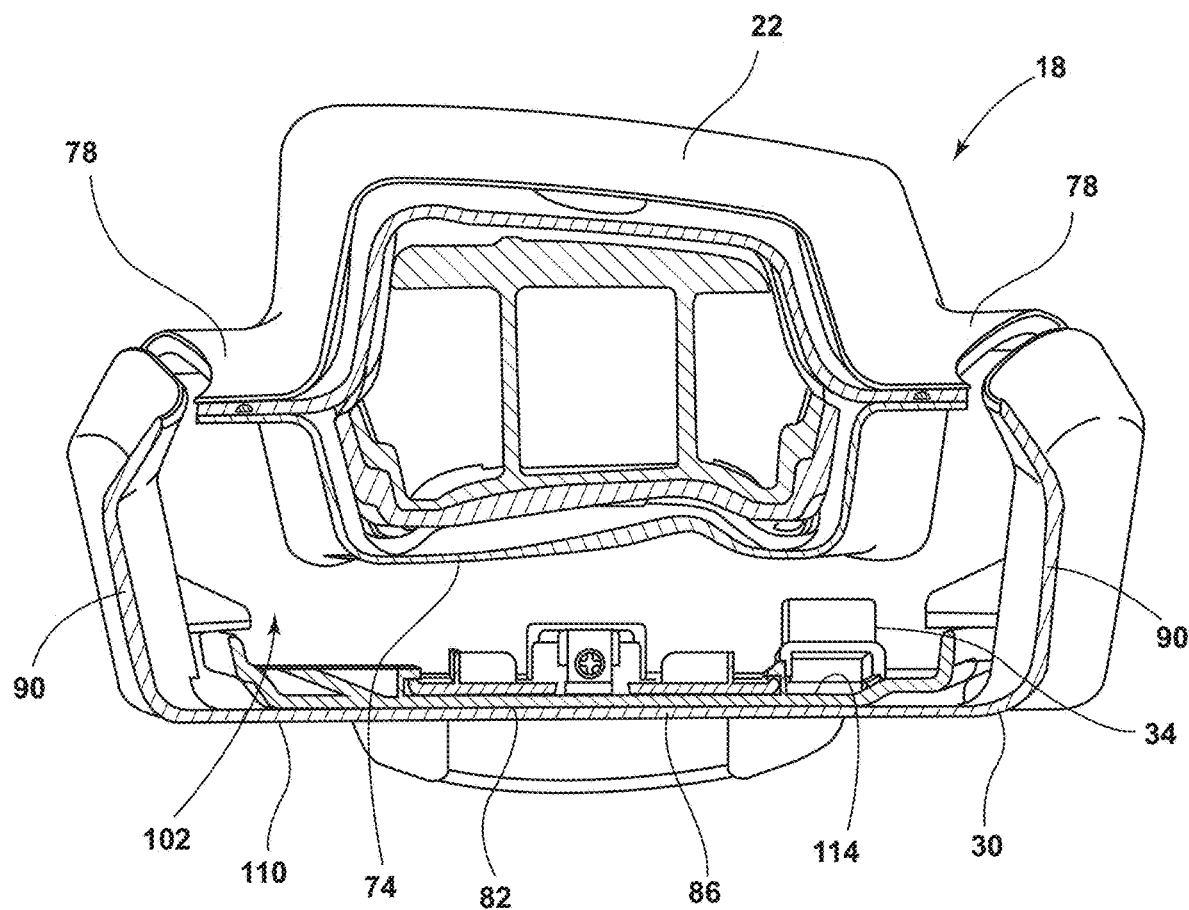
FIG. 2 is a cross-sectional view of a pillar of the vehicle of FIG. 2 taken along line II-II.

Referring now to FIG. 2, the pillar 18 includes the support structure 22. The support structure 22 generally includes metal materials or metal alloy materials. The trim member 30 may be coupled to the support structure 22 of the pillar 18. In various examples, the support structure 22 includes a center portion 74 and opposing side portions 78 extending outwardly from the center portion 74. In the depicted example where the support structure 22 may be included in the pillar 18, one side portion 78 may extend in a vehicle-forward direction and the other side portion 78 may extend in a vehicle-rearward direction. According to various aspects, the trim member 30 may include a body 82 having a central member 86 extending between two sides 90 to form a generally U-shaped trim member 30. As illustrated, the sides 90 of the trim member 30 are disposed proximate to and/or coupled to the side portions 78 of the support structure 22 of the pillar 18. The central member 86 of the trim member 30 may be spaced-apart from the center portion 74 of the support structure 22 to define a cavity 102 therebetween. When a predetermined force acts on the central member 86, the central member 86 may compress into the cavity 102 toward the support structure 22 of the pillar 18. In various aspects, the sides 90 may additionally or alternatively compress into the cavity 102. Based on the position of the trim member 30 on the vehicle 10, the trim member 30 may have any shape that corresponds with the support structure 22 or other structural component of the vehicle body 14. Moreover, while the trim member 30 is illustrated in conjunction with the pillar 18, it is contemplated that the trim member 30 may be disposed elsewhere in the vehicle 10, without departing from the teachings herein.

The body 82 of the trim member 30 has a first surface 110 and a second surface 114 that opposes the first surface 110. According to various aspects, the first surface 110 may be an A-surface and the second surface may be a B-surface of the trim member 30. As used herein, the term "A-surface" refers to a surface of any component within the vehicle 10 that is visible and/or contactable by an occupant of the vehicle 10 when the component is in an assembled state. In this way, the first surface 110 of the trim member 30 faces and/or is oriented toward the passenger compartment 26 (FIG. 1) of the vehicle 10. Contrastingly, the term "B-surface" refers to a surface of any component within the vehicle 10 that is concealed and/or non-contactable by an occupant of the vehicle 10 when the component is in an assembled state. The first surface 110 may be a continuous surface that produces the selected aesthetics of the trim member 30 for the passenger compartment 26.

Referring still to FIG. 2, the second surface 114 may include the energy absorption member 34 disposed thereon the surface, for increasing deceleration of a force and energy absorption when a predetermined force acts on the trim member 30. In this way, the energy absorption member 34 may compress to absorb energy in response to the predetermined force. The energy absorption member 34 may be coupled to the second surface 114. Alternatively, the energy absorption member 34 may be integrally formed with the trim member 30. The energy absorption member 34 is illustrated proximate to at least one of the sides 90 of the trim member 30. However, it is contemplated that the energy absorption member 34 may be disposed in any other position on the central member 86 or sides 90 of the trim member 30. According to various aspects, a single energy absorption member 34 may be disposed on the second surface 114 of the trim member 30. The positioning of the energy absorption member 34 may depend on the support structure 22 or other structural component of the vehicle 10 that the trim member 30 is associated with. In this way, the shape or location of the support structure 22 or other structural component may affect the positioning of the energy absorption member 34. Further, the positioning of the energy absorption member 34 may depend on the direction of the predetermined force acting on the trim member 30. Additionally, it is contemplated that the trim member 30 may include more than one energy absorption member 34 disposed in various positions on the second surface 114.

Figure 3:
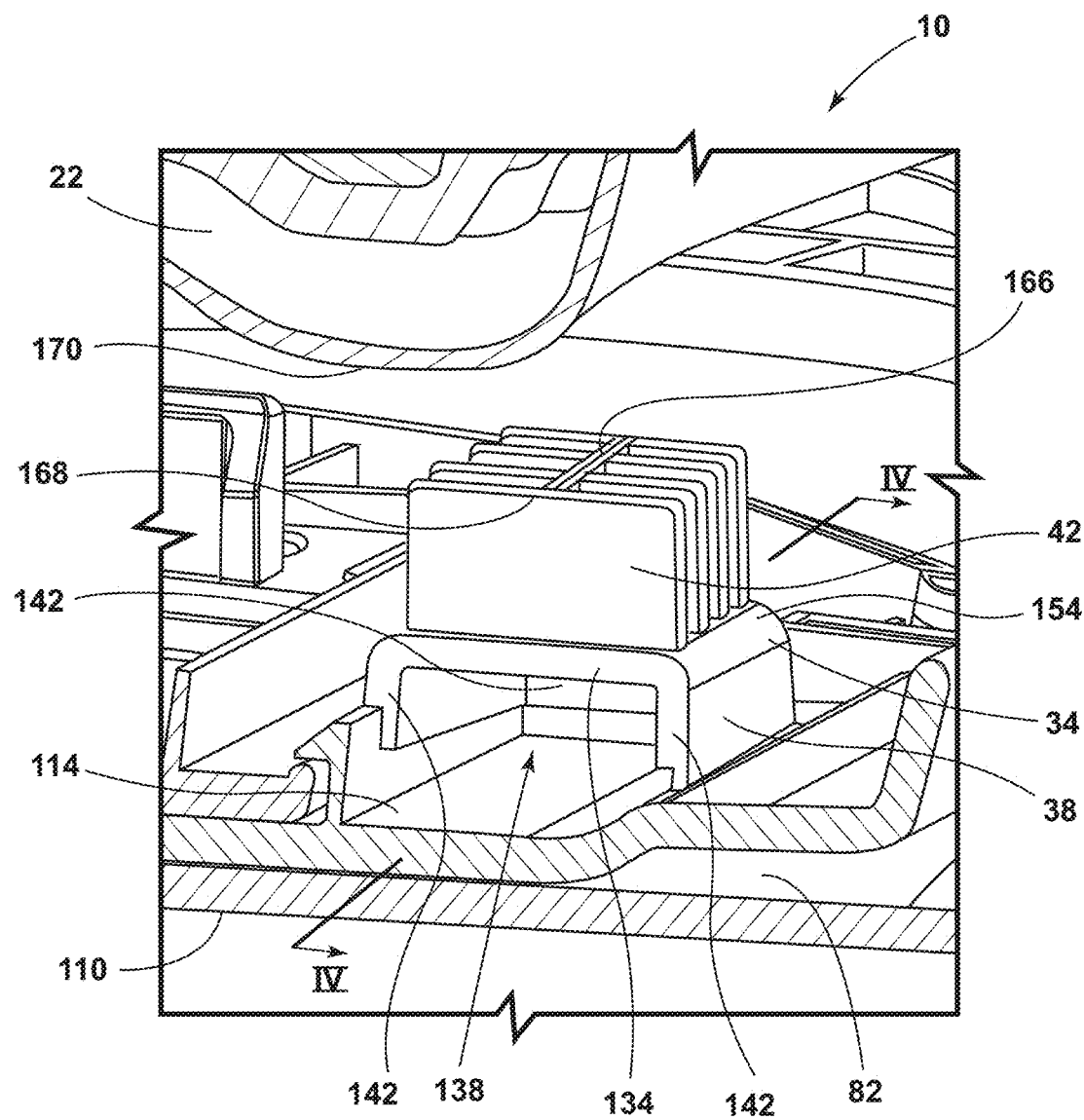
FIG. 3 is a partial top perspective view of an energy absorption member of a pillar, according to one example.

Referring to FIG. 3, the energy absorption member 34 includes the base 38 and the rib 42 coupled to the body 82. The base 38 may include a connecting wall 134 extending between sidewalls 142. The base 38 may include two opposing sidewalls 142 spaced-apart from one another and disposed generally parallel to one another. The base 38 may also include a third sidewall 142 coupled to an edge of each of the two opposing sidewalls 142 and extending therebetween. As illustrated, the base 38 includes three sidewalls 142 forming a general U-shape, however, it is contemplated that one or more additional sidewalls 142 may be included in the base 38. It is also contemplated that the base 38 includes fewer sidewalls 142. The connecting wall 134 may be spaced-apart from the second surface 114 of the body 82 of the trim member 30. As such, a chamber 138 is defined by the base 38, the sidewalls 142, and the second surface 114. The chamber 138 may be advantageous for increasing energy absorption properties of the energy absorption member 34, as well as increasing form and arrangement flexibility of the energy absorption member 34.

According to various aspects, the base 38 and the rib 42 of the energy absorption member 34 may be tunable to provide the selected energy absorption properties while maintaining the selected aesthetics of the first surface 110 of the trim member 30. For example, the sidewalls 142 of the base 38 may have a thickness that provides strength to the energy absorption member 34. Additionally, the selected thickness of the sidewalls 142 may reduce or prevent sink marks from forming on the first surface 110 (e.g., the A-surface) of the trim member 30. Reducing or preventing sink marks may be advantageous to increase the aesthetics of the trim member 30. As used herein, a "sink mark" refers to a local surface depression often caused by localized shrinkage of material at sections with greater thicknesses. Accordingly, the thickness of the sidewalls 142 of the base 38 may be a thickness that may reduce and/or prevent sink marks from forming on the first surface 110 of the trim member 30. As illustrated, the connecting wall 134 may be spaced apart from the second surface 114 and therefore may not be directly coupled to the second surface 114 of the trim member 30. As such, the thickness of the connecting wall 134 may not contribute to the sink marks on the first surface 110 of the trim member 30. Therefore, the thickness of the connecting wall 134 may be flexible, such that the thickness of the connecting wall 134 may be greater or lesser than the thickness of the sidewalls 142.

In various examples, the base 38 may be coupled to the body 82 of the trim member 30. Alternatively, the base 38 may be integrally formed with the trim member 30. In such examples, the base 38 and the trim member 30 may be molded as a single component, which may be advantageous for reducing manufacturing and production costs. The base 38 may, therefore, include the same, or similar, materials as the trim member 30. According to various aspects, the trim member 30 and the base 38 may include plastic materials.

Figure 4:
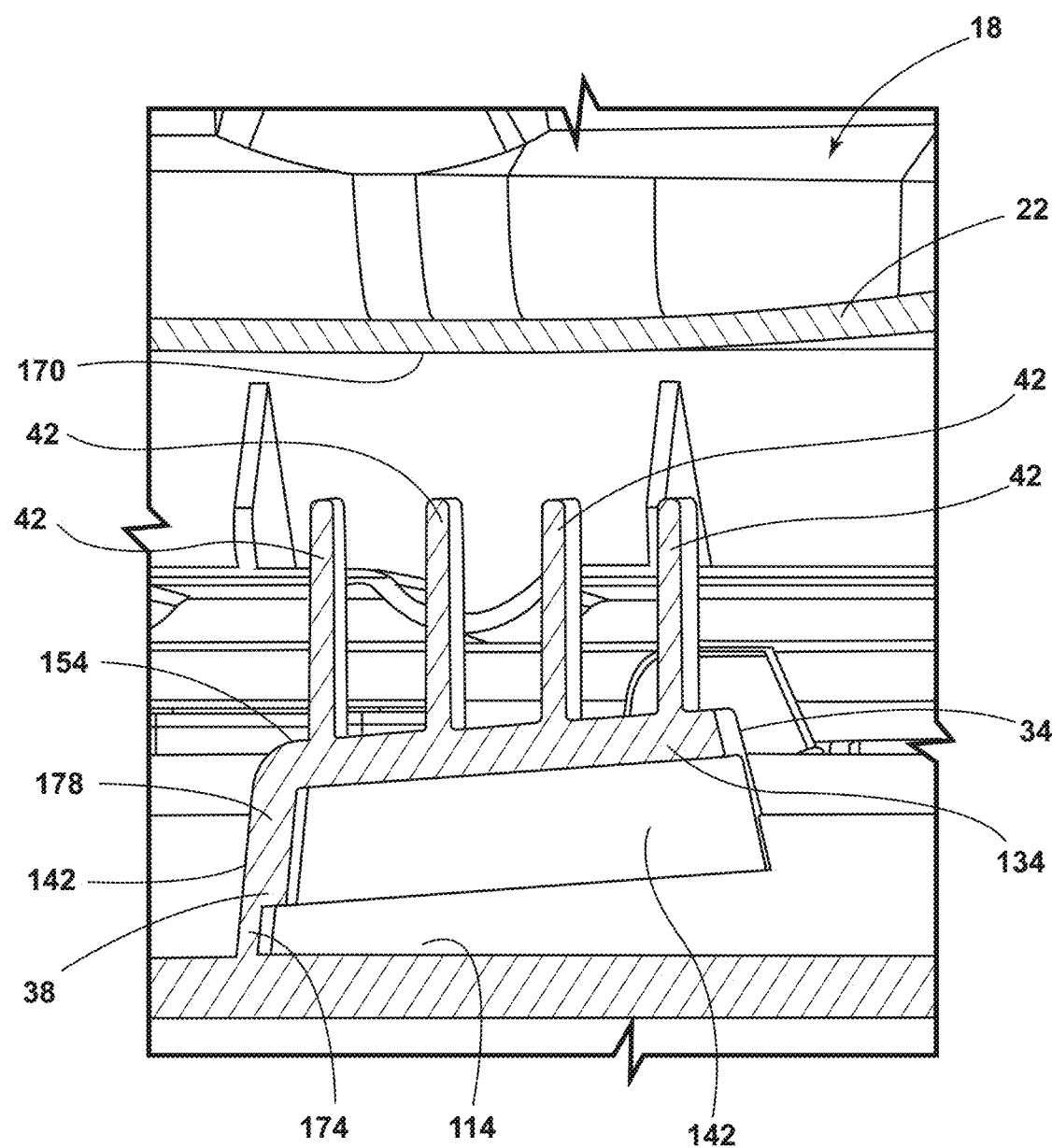
FIG. 4 is a cross-sectional view of the energy absorption member of FIG. 3 taken along line IV-IV.

Referring to FIGS. 3 and 4, the energy absorption member 34 may include the rib 42 coupled to and extending outwardly from an outer surface 154 of the base 38. In various examples, the energy absorption member 34 may include a single rib 42. Alternatively, the energy absorption member 34 may include more than one rib 42, such as, for example, multiple ribs or a plurality of ribs 42, as illustrated in FIG. 4. As best illustrated in FIG. 3, each of the ribs 42 may extend in a first direction along the outer surface 154 of the base 38. As depicted in FIG. 3, the ribs 42 extend laterally across the outer surface 154. The energy absorption member 34 may also include a transverse rib 166. The transverse rib 166 may extend in a second direction along the outer surface 154 of the base 38. The second direction may be different than the first direction. In the depicted example in FIG. 4, the transverse rib 166 extends longitudinally along the outer surface 154. Therefore, the second direction of the transverse rib 166 may be generally perpendicular and/or at an angle relative to the first direction of the ribs 42. It is also contemplated that the first direction of the ribs 42 may be the longitudinal direction and the second direction of the transverse rib 166 may be the lateral direction relative to the outer surface 154 of the connecting wall 134 of the base 38.

The transverse rib 166 may traverse the ribs 42 that extend in the first direction. As illustrated in FIG. 4, the transverse rib 166 traverses central portions 168 of each of the ribs 42. However, the transverse rib 166 may also transverse other portions of the ribs 42 and may traverse the same portion of each of the ribs 42 or different portions of the ribs 42 based on the direction the transverse rib 166 extends relative to the ribs 42. It is also contemplated that the transverse rib 166 may traverse some, but not all, of the ribs 42. Additionally or alternatively, the transverse rib 166 may abut and/or couple to outside edges of the ribs 42. According to various aspects, the energy absorption member 34 may include a single transverse rib 166, as illustrated in the depicted example. However, it is also contemplated that the energy absorption member 34 may include one or more transverse ribs 166. Further, it is contemplated that the energy absorption member 34 may not include the transverse rib 166. The transverse rib 166 may be advantageous for increasing rigidity and/or strength of the energy absorption member 34. Additionally, the ribs 42 may extend in any direction along the outer surface 154 of the connecting wall 134 and/or the sidewalls 142 of the base 38. The transverse rib 166 may also extend in any direction across the outer surface 154. In examples including the ribs 42 and the transverse rib 166, the ribs 42 and the transverse rib 166 may be integrally formed with one another. Stated differently, the ribs 42 and transverse rib 166 may be molded as a single component. In this way, the ribs 42 may be interconnected by the transverse rib 166. Alternatively, each of the ribs 42 and transverse rib 166 may be separate components. Alternatively still, some ribs 42 may be molded as a single component and other ribs 42 may be separate components.

In the examples depicted in FIGS. 3 and 4, each of the ribs 42 have the same or substantially similar lengths. In this way, each of the ribs 42 extends the same or substantially similar distances from the outer surface 154 of the connecting wall 134. When assembled in the vehicle 10, the ribs 42 extend from the base 38 towards the support structure 22 of the pillar 18, thereby decreasing the distance between the energy absorption member 34 and a contact surface 170 of the support structure 22. In various examples, the ribs 42 may be different lengths, such that the distances between the ribs 42 and the support structure 22 vary. Additionally or alternatively, as illustrated in FIG. 4, the ribs 42 each have the same or substantially similar rib thicknesses. However, each of the ribs 42, or some of the ribs 42, may have a different rib thickness. The ribs 42 may include plastic materials, such as the same or similar materials as the base 38 and/or the trim member 30. The ribs 42 may be integrally formed with the base 38 and/or the trim member 30. Alternatively, the ribs 42 may be separate components coupled to the base 38.

According to various aspects, the ribs 42 and the transverse rib 166 may be tunable to provide increased energy absorption properties for the energy absorption member 34. In such examples, various properties including, for example, the thickness, length, shape, and/or material, of the ribs 42 and/or the transverse rib 166 may be adjusted. In various examples, the trim member 30 and energy absorption member 34 may be molded, and the tooling for the ribs 42, base 38, and/or trim member 30 may be adjusted to provide for differing properties. As illustrated, the ribs 42 have a substantially rectangular shape and/or a substantially rectangular cross-sectional shape. Alternatively, the ribs 42 may have a substantially circular or oblong cross-sectional shape.

Each of the ribs 42 may be the same size and/or shape, some of the ribs 42 may be the same size and/or shape, or each of the ribs 42 may be different sizes and/or shapes. The shapes and/or sizes of the ribs 42 may be selected based on the position of the energy absorption member 34 on the trim member 30 and/or in the vehicle 10 to provide for the selected energy absorption properties. The ribs 42 disposed on the base 38 may provide for greater flexibility for the form and arrangement of the ribs 42. The thickness, length, shape, material, or any other aspect of the ribs 42 may be adjusted with minimal or no effect on the first surface 110 (e.g., A-surface) relating to sink marks and other surface defects. Additionally or alternatively, the ribs 42 may be tuned based on the contact surface 170 of the support structure 22. The shape, material, angle, or other properties of the contact surface 170 and/or the support structure 22 may affect the compression of the ribs 42 and/or the base 38 when the predetermined force acts on the energy absorption member 34, and therefore the ribs 42 and/or the base 38 may be tuned to the corresponding contact surface 170. Similar adjustments are also contemplated with respect to the transverse rib 166.

Referring still to FIG. 4, the ribs 42 may be arranged in a spaced-apart manner across the outer surface 154 of the base 38. As illustrated, the ribs 42 are substantially equidistantly spaced-apart from one another. Alternatively, the distance between adjacent ribs 42 may differ. The ribs 42 may be disposed substantially parallel to one another. However, it is contemplated that the ribs 42 may be arranged in any pattern or may be disposed randomly on the base 38. The positioning of the ribs 42 on the base 38 may depend on the position of the energy absorption member 34 on the trim member 30, the location of the trim member 30 in the vehicle 10, and/or the direction of the predetermined force.

The base 38 may have varying thicknesses to provide for increased strength while reducing and/or preventing sink marks on the first surface 110 of the trim member 30. An inner portion 174 of the base 38 may have a different thickness than an outer portion 178. In various aspects, the inner portion 174 may have a thickness less than a thickness of the outer portion 178; however, the inner portion 174 may also have a greater thickness than the outer portion 178. In this way, the base 38 may have a thickness that prevents and/or reduces sink marks proximate the second surface 114 of the trim member 30 while providing increased energy absorbing properties.

Referring to FIGS. 1-4, the energy absorption member 34, including the base 38, the ribs 42, and/or the transverse rib 166, may compress in response to the predetermined force acting on the energy absorption member 34. In this way, the base 38, the ribs 42, and/or the transverse rib 166 may compress when the predetermined force acts upon the base 38, ribs 42, and/or the transverse rib 166. In operation, a force may act upon the first surface 110 of the trim member 30. Once the force reaches a predetermined level, the trim member 30 may compress into the cavity 102 toward the support structure 22. As the trim member 30 compresses, the energy absorption member 34 may move toward the support structure 22. The ribs 42 of the energy absorption member 34 may contact the contact surface 170 of the support structure 22 and compress when the predetermined force is acting on the ribs 42. In various examples, the transverse rib 166 may be advantageous for guiding the compression of the ribs 42 to provide for the selected energy absorption properties. In this way, the direction that the ribs 42 compress may be guided by the transverse rib 166. Similarly, the ribs 42 may guide the compression of the transverse rib 166.

Additionally or alternatively, the base 38 may contact the support structure 22. When the predetermined force acts upon the base 38, the base 38 may compress. The ribs 42, transverse rib 166, and/or base 38 may also compress without contacting the contact surface 170 without departing from the teachings herein. In such examples, the predetermined force acting on the first surface 110 of the trim member 30 may cause the base 38, the ribs 42, and/or the transverse rib 166 to compress. According to various aspects, the trim member 30 and/or the base 38 may compress into the chamber 138 defined therebetween in response to the predetermined force. Moreover, in various examples, the energy absorption member 34 may be resiliently deformable and/or resiliently compressible. The energy absorption member 34 may provide energy absorption properties to the trim member 30 and/or decelerate the predetermined force acting upon the trim member 30 as the trim member 30 is compressed toward the support structure 22.

Use of the present disclosure may provide a variety of advantages. For example, the ribs 42, the transverse rib 166, the connecting wall 134 of the base 38, and/or the outer portion 178 of the base 38 of the energy absorption member 34 may be tuned to provide increased energy absorption. Moreover, the form and arrangement of the ribs 42 and transverse rib 166 may be adjusted with minimal to no interference with the first surface 110 of the trim member 30. This may provide increased energy absorption while generally maintaining aesthetics of the trim member 30 within the passenger compartment 26. The tuning of the ribs 42 and/or the transverse rib 166 may be accomplished while reducing and/or preventing sink marks within the first surface 110 of the trim member 30. Additionally, the energy absorption member 34 may reduce the gap between the trim member 30 and the support structure 22, which may increase energy absorption and assist in deceleration of the predetermined force acting on the trim member 30. Also, the energy absorption member 34 and the trim member 30 may be integrally formed as one component, which may reduce manufacturing and production costs. Additional benefits or advantages of using this device may also be realized and/or achieved.

According to various examples, a vehicle includes a vehicle body including a pillar. The pillar includes a support structure. A passenger compartment is defined by the vehicle body. A trim member disposed in the passenger compartment on the pillar. An energy absorption member is coupled to the trim member. The energy absorption member includes a base and at least one rib extending from the base. Embodiments of the present disclosure may include one or a combination of the following features:

- a trim member includes a first surface facing a passenger compartment and a second opposing surface, and an energy absorption member is coupled to the second opposing surface of the trim member;
- at least one rib extends toward a support structure of a vehicle body;
- at least one rib includes a plurality of ribs;
- an energy absorption member is integrally formed with a trim member;
- an energy absorption member compresses in response to a predetermined force acting on the energy absorption member; and
- a base includes sidewalls coupled via a connecting wall, and at least one rib is integrally formed with the connecting wall.

According to various examples, a trim member for a vehicle pillar includes a body having a first surface and a second surface. The first and second surfaces are opposing surfaces. A base is coupled to the second surface of the body. The base includes sidewalls coupled via a connecting wall. More than one rib is coupled to an outer surface of the connecting wall of the base. Embodiments of the present disclosure may include one or a combination of the following features:

- more than one rib includes a plurality of ribs extending in a first direction along a base and a transverse rib extending in a second direction along the base;
- a the transverse rib traverses a central portion of each rib of a plurality of ribs;
- more than one rib compresses in response to a predetermined force acting on the more than one rib;
- a base compresses in response to a predetermined force acting on the base;
- a connecting wall of a base is spaced-apart from a second surface of a body;
- more than one rib includes a first rib and a second rib, and the first rib has a length different than a length of the second rib; and
- more than one rib includes a first rib and a second rib, and the first rib has a thickness different than a thickness of the second rib.

According to various examples, a trim member includes a body having a first surface and a second surface. A base is integrally formed with the base. The base includes sidewalls and a connecting wall. The connecting wall is spaced-apart from the second surface of the body. A plurality of ribs is coupled to and extends from the connecting wall of the base. Embodiments of the present disclosure may include one or a combination of the following features:

- a plurality of ribs and a base each compress in response to a predetermined force acting on the plurality of ribs and the base, respectively;
- a plurality of ribs are spaced-apart along a connecting wall;
- a plurality of ribs are equidistantly spaced-apart from one another; and
- a plurality of ribs are disposed parallel to one another.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
   a vehicle body includes a pillar, wherein the pillar includes a support structure;
   a passenger compartment defined by the vehicle body;
   a trim member disposed in the passenger compartment on the pillar; and
   an energy absorption member coupled to the trim member, wherein the energy absorption member includes a base and at least one rib extending from the base, and wherein the energy absorption member is integrally formed with the trim member.

2. The vehicle of claim 1, wherein the trim member includes a first surface facing the passenger compartment and a second opposing surface, and further wherein the energy absorption member is coupled to the second opposing surface of the trim member.

3. The vehicle of claim 1, wherein the at least one rib extends toward the support structure of the vehicle body.

4. The vehicle of claim 1, wherein the at least one rib includes a plurality of ribs.

5. The vehicle of claim 1, wherein the energy absorption member compresses in response to a predetermined force acting on the energy absorption member.

6. The vehicle of claim 1, wherein the base includes sidewalls coupled via a connecting wall, and further wherein the at least one rib is integrally formed with the connecting wall.

7. A trim member for a vehicle pillar, comprising:
   a body having a first surface and a second surface, wherein the first and second surfaces are opposing surfaces;
   a base coupled to the second surface of the body, wherein the base includes sidewalls coupled via a connecting wall; and
   more than one rib coupled to an outer surface of the connecting wall of the base.

8. The trim member of claim 7, wherein the more than one rib includes a plurality of ribs extending in a first direction along the base and a transverse rib extending in a second direction along the base.

9. The trim member of claim 8, wherein the transverse rib traverses a central portion of each rib of the plurality of ribs.

10. The trim member of claim 7, wherein the more than one rib compresses in response to a predetermined force acting on the more than one rib.

11. The trim member of claim 7, wherein the base compresses in response to a predetermined force acting on the base.

12. The trim member of claim 7, wherein the connecting wall of the base is spaced-apart from the second surface of the body.

13. The trim member of claim 7, wherein the more than one rib includes a first rib and a second rib, and further wherein the first rib has a length different than a length of the second rib.

14. The trim member of claim 7, wherein the more than one rib includes a first rib and a second rib, and further wherein the first rib has a thickness different than a thickness of the second rib.

15. A trim member, comprising:
   a body having a first surface and a second surface;
   a base integrally formed with the body, wherein the base includes sidewalls and a connecting wall, and further wherein the connecting wall is spaced-apart from the second surface of the body; and
   a plurality of ribs coupled to and extending from the connecting wall of the base.

16. The trim member of claim 15, wherein the plurality of ribs and the base each compress in response to a predetermined force acting on the plurality of ribs and the base, respectively.

17. The trim member of claim 15, wherein the plurality of ribs are spaced-apart along the connecting wall.

18. The trim member of claim 15, wherein the plurality of ribs are equidistantly spaced-apart from one another.

19. The trim member of claim 15, wherein the plurality of ribs are disposed parallel to one another.

* * * * *